US009897479B2

(12) United States Patent
Bonnett et al.

(10) Patent No.: US 9,897,479 B2
(45) Date of Patent: Feb. 20, 2018

(54) ASSEMBLY AND METHOD OF COMPONENT MONITORING

(71) Applicant: GE Aviation Systems Limited, Cheltenham, Gloucestershire (GB)

(72) Inventors: Steven Bonnett, Southampton (GB); Timothy Robert North, Southampton (GB); Tod Alexander Gilbert, Southampton (GB)

(73) Assignee: GE AVIATION SYSTEMS LIMITED (GB)

( * ) Notice: Subject to any disclaimer, the term of this patent is extended or adjusted under 35 U.S.C. 154(b) by 225 days.

(21) Appl. No.: 14/835,029

(22) Filed: Aug. 25, 2015

(65) Prior Publication Data
US 2016/0076931 A1 Mar. 17, 2016

(30) Foreign Application Priority Data

Sep. 15, 2014 (GB) .................................. 1416252.3

(51) Int. Cl.
*G01H 1/00* (2006.01)
*G01P 3/44* (2006.01)
*G01H 3/04* (2006.01)

(52) U.S. Cl.
CPC ............... *G01H 1/003* (2013.01); *G01H 3/04* (2013.01); *G01P 3/44* (2013.01)

(58) Field of Classification Search
CPC .......... G01H 1/003; G01H 1/006; G01H 3/04; G01M 13/028; G01M 13/021; G01M 13/045; G01N 29/14; G01N 29/42; G01N 29/449
See application file for complete search history.

(56) References Cited

U.S. PATENT DOCUMENTS

| 4,213,114 | A | * | 7/1980 | Cochard | G01H 1/003 340/508 |
| 4,302,813 | A | * | 11/1981 | Kurihara | F01D 19/00 702/56 |
| 4,408,294 | A | * | 10/1983 | Imam | G01H 1/006 702/35 |
| 4,435,770 | A | * | 3/1984 | Shiohata | G01H 1/003 700/279 |
| 4,872,337 | A | * | 10/1989 | Watts | F16H 57/00 702/179 |

(Continued)

FOREIGN PATENT DOCUMENTS

WO 2004090486 A1 10/2004

OTHER PUBLICATIONS

Great Britain Search Report dated Feb. 25, 2015 which was issued in connection with Patent Application No. GB 1416252.3 which was filed on Sep. 15, 2014.

*Primary Examiner* — Helen Kwok
(74) *Attorney, Agent, or Firm* — GE Global Patent Operation

(57) ABSTRACT

A method of component monitoring for machinery having multiple rotating elements, which are rotated at different rotational speeds, the method including sampling data from the vibration sensor at a sampling frequency at least as great as the fastest rotational speed of the multiple rotating elements to form a data set and determining an actual rotational frequency for at least some of the rotating elements during the sampling of the data.

19 Claims, 4 Drawing Sheets

(56) References Cited

U.S. PATENT DOCUMENTS

| | | | | |
|---|---|---|---|---|
| 5,258,923 A * | 11/1993 | Imam | .................... | G01H 1/003 340/683 |
| 5,445,028 A * | 8/1995 | Bianchi | ................. | G01H 1/003 73/593 |
| 6,681,634 B2 * | 1/2004 | Sabini | ................... | G01H 1/003 73/593 |
| 7,640,802 B2 * | 1/2010 | King | ...................... | G01H 1/003 702/113 |
| 7,912,659 B2 * | 3/2011 | Luo | ........................ | F16H 57/01 702/35 |
| 2005/0096873 A1 * | 5/2005 | Klein | .................... | G01H 1/006 702/184 |
| 2008/0234964 A1 * | 9/2008 | Miyasaka | .............. | G01H 1/003 702/113 |
| 2011/0285532 A1 * | 11/2011 | Hedin | ................ | G01M 13/045 340/540 |
| 2012/0079832 A1 * | 4/2012 | Benitah | ................ | F01D 21/003 60/802 |
| 2015/0355044 A1 * | 12/2015 | Cardinal | ................ | G01M 1/22 73/455 |

\* cited by examiner

ASSEMBLY AND METHOD OF COMPONENT MONITORING

BACKGROUND OF THE INVENTION

Vibration data may be acquired for a machine, including an aircraft, and personnel may then attempt to identify any problems from the vibration data and fix them. Historically, vibration data has been acquired on a per component basis using variable sampling rates to target specific speed components. In this manner, data is acquired from a single sensor multiple times for each of the components.

BRIEF DESCRIPTION OF THE INVENTION

In one embodiment, the invention relates to a method of component monitoring for machinery having multiple rotating elements, which are rotated at different rotational speeds, and at least one vibration sensor, the method includes sampling data from the vibration sensor at a sampling rate sufficient to monitor a fastest rotational speed of the multiple rotating elements to form a data set, determining an actual rotational frequency for at least some of the rotating elements during the sampling of the data, and generating a virtual vibration waveform from the data set for at least some of the rotating elements by filtering the data set to a sample rate to monitor each of the at least some of the rotating elements.

In another embodiment, the invention relates to an assembly, having rotating machinery having multiple rotating elements, which are rotated at different rotational speeds, a vibration sensor configured to measure vibrations of the multiple rotating elements, a tachometer configured to measure the rotational speed of one of the multiple rotating elements, and a processor operably coupled to the vibration sensor and tachometer to receive information therefrom and configured to sample data at a sampling rate sufficient to monitor the fastest rotational speed of the multiple rotating elements to form a data set, determine an actual rotational frequency for at least some of the rotating elements during the sampling of the data, and generate a virtual vibration waveform from the data set for at least some of the rotating elements by filtering the data set to a sampling rate to monitor at least some of the rotating elements.

DESCRIPTION OF EMBODIMENTS OF THE INVENTION

Figure 1:
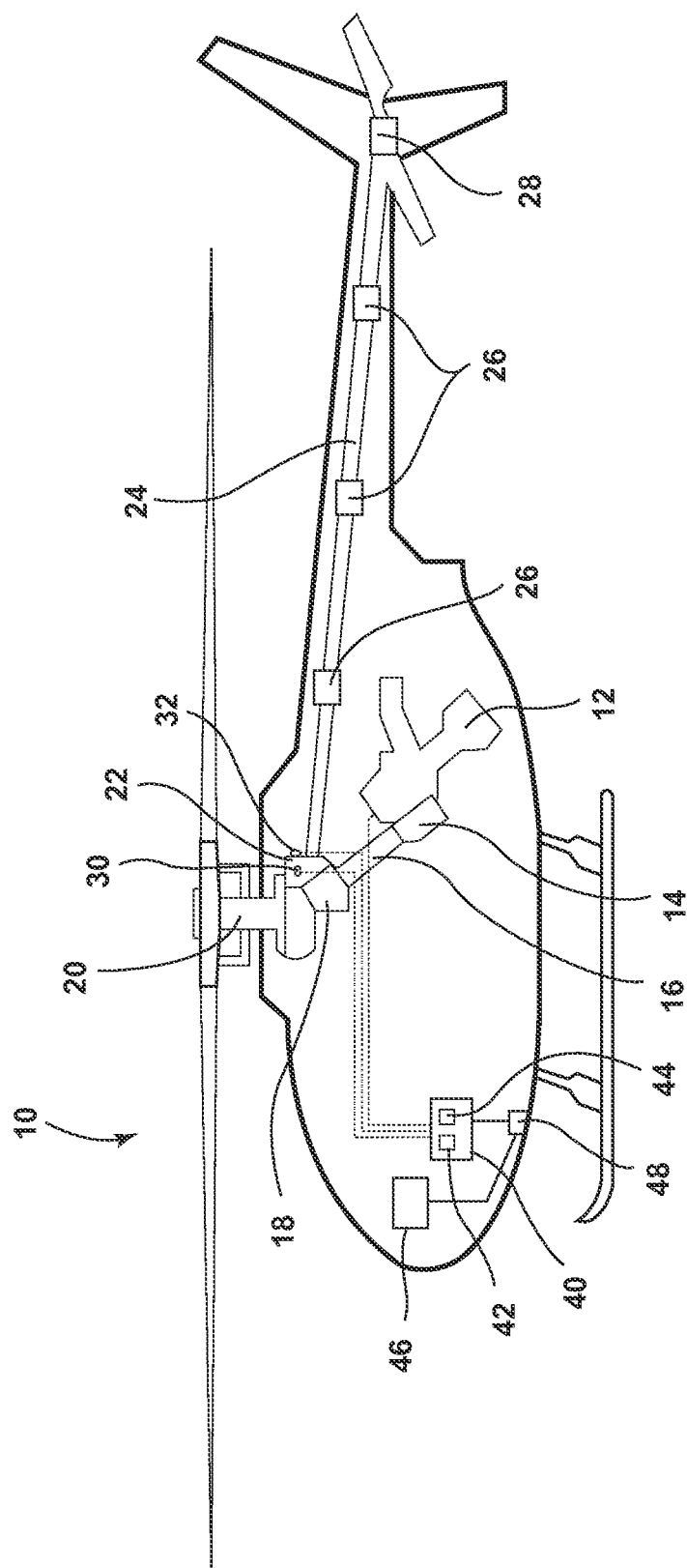
FIG. 1 is a schematic view of a rotorcraft in which embodiments of the invention may be implemented.

FIG. 1 schematically depicts an assembly in the form of an aircraft, specifically a rotorcraft 10, which may execute embodiments of the invention and may include rotating machinery having multiple rotating elements, which are rotated at different rotational speeds. More specifically, the rotorcraft 10 has been illustrated as including a propulsion system that includes a gas turbine engine 12, gearbox 14, driveshaft 16, transmission 18, main rotor 20, tail rotor reduction gearbox 22, tail rotor driveshaft 24 with various support bearings 26 and tail rotor gearbox 28. The engine 12 drives the transmission 18 through the driveshaft 16, rotating the main rotor 20. Power is also taken off the transmission 18 to drive the tail rotor driveshaft 24. One or more control mechanisms (not shown) may be included within the rotorcraft 10 and may be operated by a pilot to operate the rotorcraft 10. While a rotorcraft has been illustrated, it will be understood that the assembly having the multiple rotating elements may be any suitable assembly including an alternative vehicle, a wind turbine, or an engine.

To determine vibration data, a vibration sensor 30 is included in the assembly. The vibration sensor 30 may be configured to measure vibrations of the multiple rotating elements. It will be understood that the vibration sensor 30 may be suitably located in any part of the rotorcraft 10 where there are rotating elements to be monitored. A tachometer 32 may also be located in the rotorcraft 10 and may be configured to measure the rotational speed of one of the multiple rotating elements. For example, the tachometer 32 may measure the rotational speed of one of the gears in the tail rotor reduction gearbox 22. Again, it will be understood that the tachometer 32 may be suitably located adjacent any of the rotating elements in the rotorcraft 10.

A controller 40 may be operably coupled to the vibration sensor 30 and tachometer 32 such that it may receive information therefrom. The controller 40 may also be connected with other components and systems of the rotorcraft 10 including other controllers of the rotorcraft 10. The controller 40 may include memory 42, the memory 42 may include random access memory (RAM), read-only memory (ROM), flash memory, or one or more different types of portable electronic memory, such as discs, DVDs, CD-ROMs, etc., or any suitable combination of these types of memory. The memory 42 may include information related to the rotorcraft 10 including reference values for the rotating elements located therein.

The controller 40 may include one or more processors 44, which may be running any suitable programs. The controller 40 may include or cooperate with any number of software programs or instructions designed to carry out the various methods, process tasks, calculations, and control/display functions necessary for operation of the rotorcraft 10. The controller 40 is illustrated as being in communication with the components and systems including the engine 12 and it is contemplated that the controller 40 may aid in operating the rotorcraft and may receive information from the components and systems. The controller 40 may be a portion of a flight management system or may be operably coupled to the flight management system. The controller 40 may also be operably coupled to a flight display 46 such that information may be displayed to a pilot of the rotorcraft 10.

While the description has thus far focused on the processor in the rotorcraft 10, it is contemplated that portions of the embodiments of the invention may be implemented anywhere including in a processor or computer at a ground system, which may be in communication with the rotorcraft 10 via any suitable communication link. Such a processor at the ground system may be considered part of the assembly even though it is remote from the rotorcraft 10. A communication module 48 may be included in the rotorcraft 10 for transmitting various data from the rotorcraft 10 to such a ground-based processor. For example, it is contemplated that the data from the vibration sensor 30 and the tachometer 32 may be sent via the communication module 48 to a ground-based processor. Alternatively, the controller 40 may process such information and send the processed information via the communication module 48. The communication module 48 may be capable of wirelessly linking with other systems and devices through packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof It will also be understood that the particular type or mode of wired or wireless communication is not critical to embodiments of this invention, and later-developed wireless networks are certainly contemplated as within the scope of embodiments of the invention.

For ease of explanation, the remainder of the description will focus on the operation of the controller 40 although it will be understood that a remote processor could alternatively be used. The controller 40 may include all or a portion of a computer program having an executable instruction set for component monitoring. The program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general-purpose computer, special purpose computer, or special-purpose processing machine to perform a certain function or group of functions.

Figure 2:
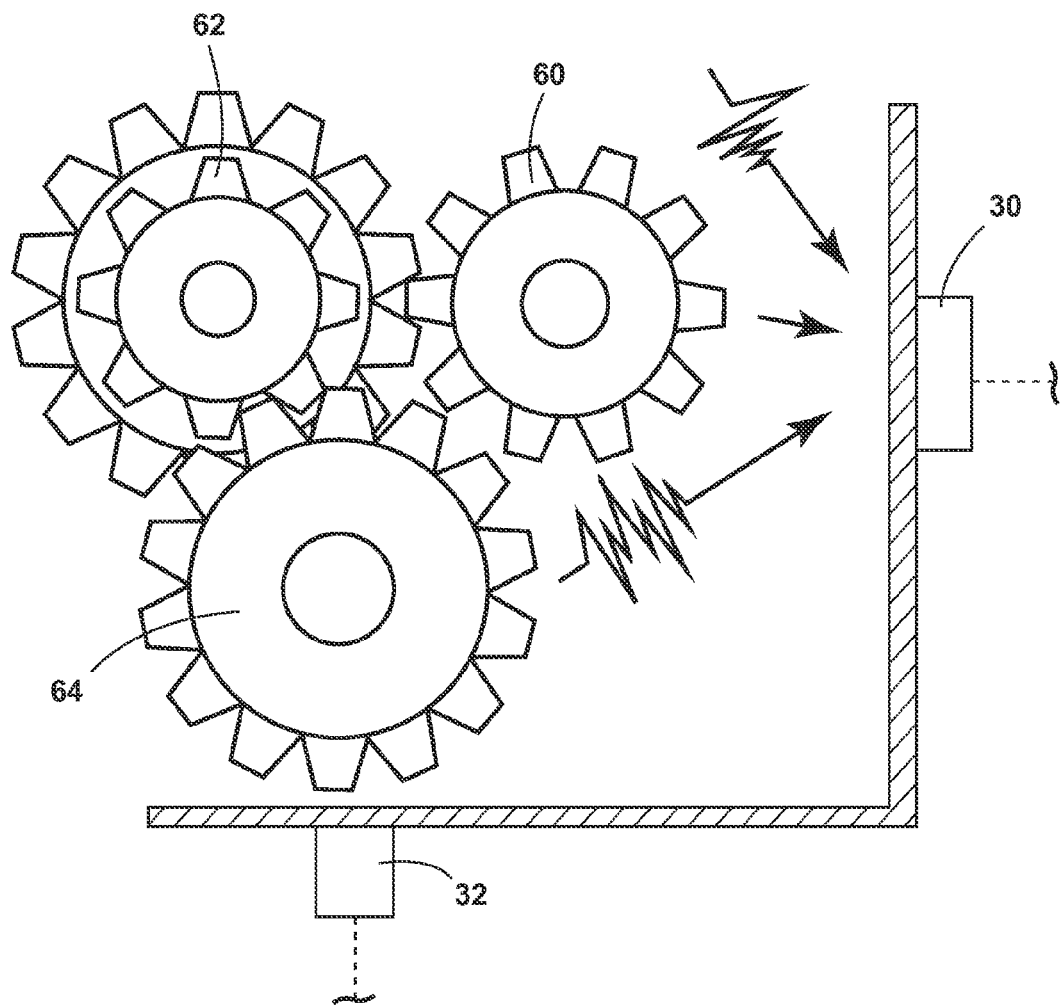
FIG. 2 is a schematic diagram of multiple rotating elements and sensors that may be included in the rotorcraft of FIG. 1.
Figure 3:
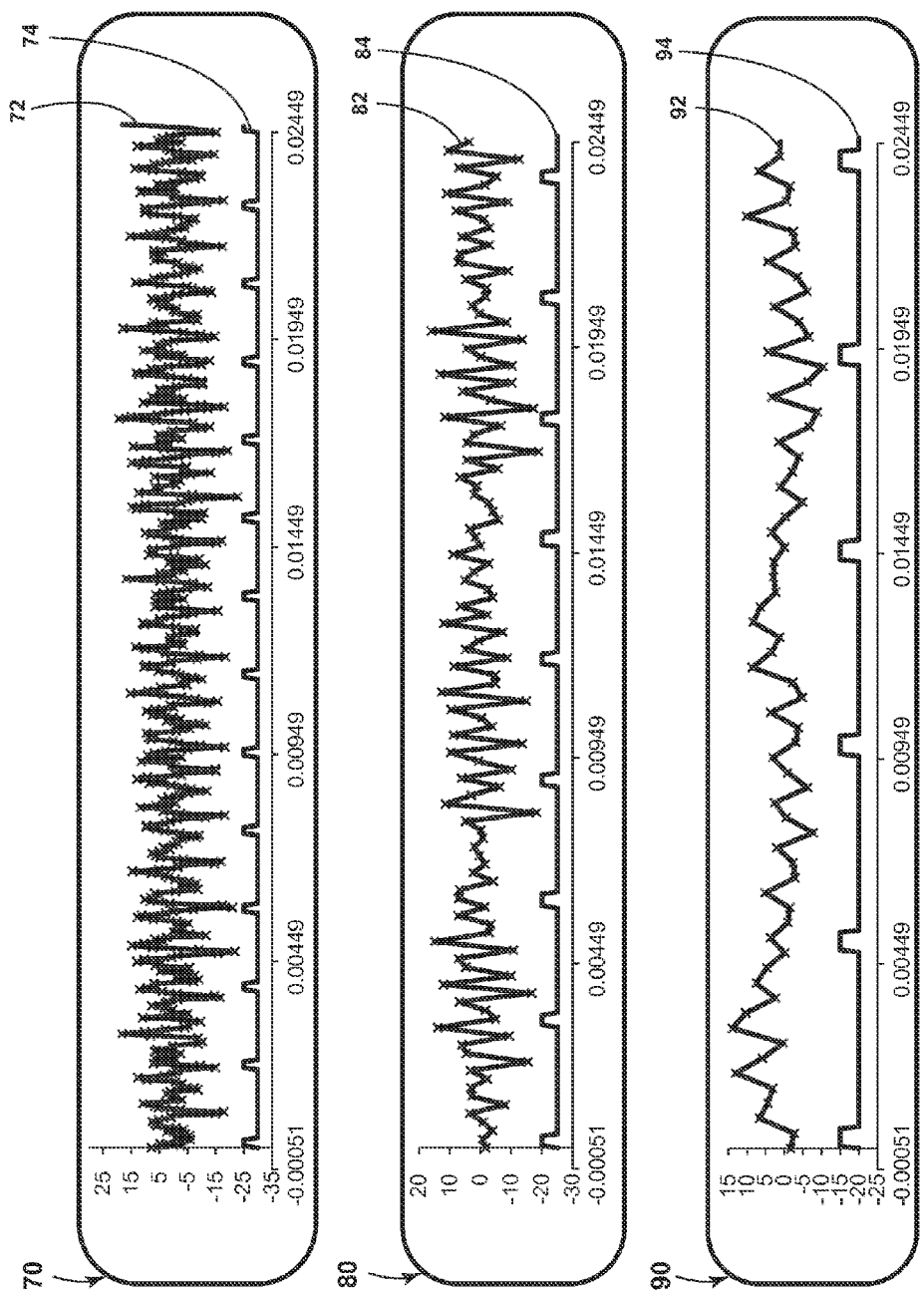
FIG. 3 illustrates exemplary data waveforms that may be generated.

For ease of explanation, FIG. 2 illustrates exemplary rotating components in the form of gears 60, 62, 64, which are rotated at different rotational speeds. During operation of the rotorcraft 10, the controller 40 may receive information from the vibration sensor 30 and tachometer 32. It is contemplated that the data may be acquired during a stable flight condition of the rotorcraft 10 so that no other factors are influencing the sensor data. The controller 40 may sample data from the vibration sensor 30 at a sampling rate sufficient to monitor the fastest rotational speed of the multiple rotating elements (i.e. the gears 60, 62, 64) to form a data set. The controller may use the sensor data from the tachometer 32 to determine an actual rotational frequency for the gears 60, 62, 64 during the sampling of the data. More specifically, the tachometer 32 is used to identify one revolution of each component. For example, included in the memory 42 of the controller 40 may be the component geometry including how the components interact. Based on such information the controller 40 may generate a virtual vibration waveform from the data set for at least some of the rotating elements by filtering the data set to a sampling rate to monitor each of the gears 60, 62, 64.

More specifically, a raw data chart 70 is illustrated as including vibrational data 72 and tachometer data 74. Such data may be acquired at a maximum sample rate to form the raw data. A filter may be applied to the raw data chart 70 to re-sample to a set number of points per rotation for each speed of each of the rotating components. For example, chart 80 represents the data re-sampled for gear 60. The vibration data 82 has been re-sampled to a sampling rate, by way of example only, of 4777 Hz and the modified tachometer data 84 for the gear 60 is shown. Conversely, chart 90 represents the data re-sampled for gear 64. The vibration data 92 has been re-sampled to a sampling rate, by way of example only, to 2770 Hz and the modified tachometer data 94 for the gear 64 is shown. It has been determined that there is a one to many relationship between vibration sensors, such as accelerometers, and the rotating components they monitor and that the application of a filter allows for generation of waveforms as if they had been sampled at a reduced rate. Thus, for each rotating component the raw data may be re-sampled using a filter to a common number of data points per revolution. Thus, it will be understood that the controller 40 may include a filter for generating the virtual vibration waveforms. The controller 40 may alternatively apply a set of fixed re-sampling filters to a set sampling rate to the raw data in order to generate the virtual vibration waveforms. As yet another alternative, the controller 40 may use multiple sampling units sampling the raw data at different rates from the same sensor.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that may be used to carry or store desired program code in the form of machine-executable instructions or data structures and that may be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc., that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices. The above representation is merely for context and it will be understood that the assembly with the rotating machinery may include any suitable additional components and be utilized in any suitable manner.

Figure 4:
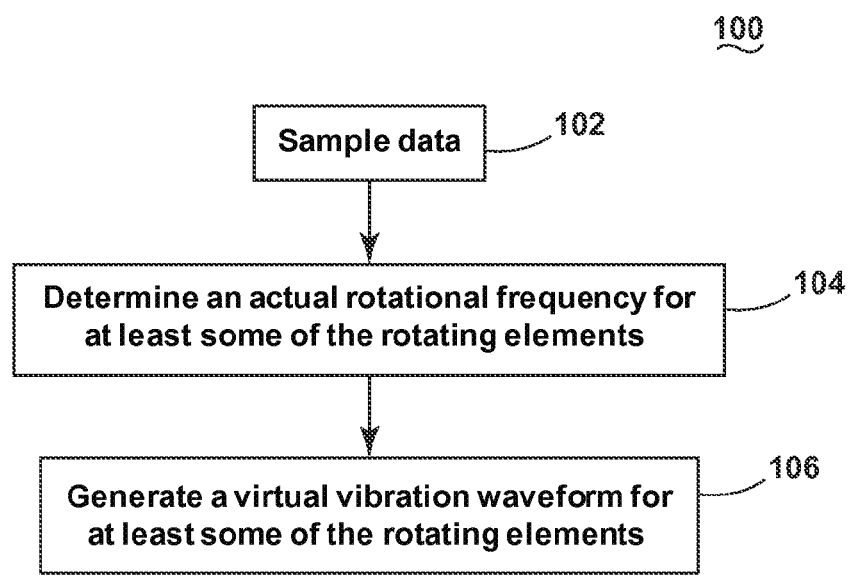
FIG. 4 is a flowchart illustrating a method of component monitoring according to an embodiment of the invention.

In accordance with an embodiment of the invention, FIG. 4 illustrates a method 100, which may be used for component monitoring. The method 100 begins at 102 by a processor, such as the controller 40, sampling data from the vibration sensor 30, at a sampling rate sufficient to monitor the fastest rotational speed of the multiple rotating elements of the rotorcraft 10 to form a data set. In the case of the rotorcraft 10 having the gears 60, 62, 64 the vibration sensor 30 may detect vibrations from all three rotating components.

At 104, an actual rotational frequency may be determined by the controller 40 for at least some of the rotating elements during the sampling of the data. More specifically, a sensor signal may be received from the tachometer 32 and this information and the known setup of the gears 60, 62, 64 including the number of times each rotates with the rotation of the gear 64 may be used to determine the actual rotational frequency of each of the gears 60, 62, 64. For example, the controller 40 may utilize the data from the tachometer 32 and the known geometry of the components to determine the relative speed of each individual component. It is contemplated that that the actual rotational frequency of all of the rotating elements may be determined or at least all of the rotating elements to be monitored. This data is then used to identify individual rotations of each component in the raw data.

Desired re-sample rates are deduced from the rotational rate of the components and the number of teeth, and the filter is applied to the raw signal over the time periods to produce the virtual waveforms at 106. Thus, virtual vibration waveforms may be generated from the data set for at least some of the rotating elements by filtering the data set to a sampling rate for at least some of the rotating elements. By way of non-limiting example, for a specific component, an exact re-sampling rate may be chosen based on how many samples per revolution of the component are desired. By way of non-limiting examples, such re-sampling filters may generally be considered as interpolating or decimating filters depending on whether they are up-sampling or down-sampling. The high sample rate obtained as explained above may be down-sampled to a lower sample rate. It will be understood that there may be instances where it may be desired to capture a specific number of samples per tooth on a gear with many teeth, which is rotating quickly. In such an instance, the raw data may be up-sampled. It is also contemplated that a combination of a decimation filter, such as a fixed ratio filter, may be used together with an interpolation filter and that this combination may be considered to be filtering the data set to a sampling rate to monitor each of the at least some of the multiple rotating elements. This allows one sensor acquisition to produce data relating to the health of multiple components of different rotating speeds. The filter may be applied to the data to re-sample to a set number of points per rotation for each speed of rotating component. In this manner, virtual vibration waveforms are generated for all of the rotating elements as the application of a filter allows virtual waveforms to be produced as if they had been sampled at a different rate, including a reduced rate.

It will be understood that the method of component monitoring is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. For example, in the case where the rotating machinery is an aircraft the method may begin by flying the aircraft in a fixed flight regime during the sampling.

By way of further non-limiting example, the method 100 may also include that once the virtual vibration waveforms have been generated one or more of them may be processed to determine a health of the machinery. This may include detecting or predicting, by a processor, a mechanical fault based on the determined vibration of at least one rotating component. By way of non-limiting example, this may include that the virtual waveforms may be compared to reference values. The reference values may be any suitable values including that the reference values may include historically defined values or suitable ranges related to the rotating components. For example, the reference value may be calculated from historical sensor output. Thus, the virtual waveforms may be compared to results obtained from previous flights for the same aircraft and against the whole fleet of aircraft. Alternatively, the reference value may be stored in memory 42 as described above. The processing may include determining whether a virtual waveform satisfies a predetermined threshold. In this manner, the controller 40 and/or a ground-based computer may determine if the results of the comparison are acceptable. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. The controller 40 may also be configured process the virtual vibration waveforms over time to determine drifts, trends, steps or spikes in the vibration waveforms in order to predict faults in the rotating machinery. Such anomalies in the data may be too subtle on a day-to-day comparison to make such predictions of fault.

In implementation, the reference values and comparisons may be converted to an algorithm to monitor components of the rotating machinery. Such an algorithm may be converted to a computer program comprising a set of executable instructions, which may be executed by the controller 40 and/or an alternative processor.

It is also contemplated that the method or portions of the method may be repeated. For example, the flying, sampling, determining, generating, and processing may be repeated after a predetermined number of flight hours. Still yet another example of how the method 100 may differ is that the method may include that the data set and tachometer data may be transmitted from the rotorcraft so that an alternative processor may generate the virtual vibration waveforms. Alternatively, the generated virtual vibration waveforms may be transmitted from the aircraft so that a ground-based processor may process them. Furthermore, the method may also include providing an indication of any determined faults or predicted mechanical failures. The indication may be provided in any suitable manner at any suitable location including on a display 46 within the rotorcraft 10 and/or at the ground system. For example, this may include providing an alert to a user when a mechanical fault is detected.

Beneficial effects of the above-described embodiments include that data gathered by a single sensor may be utilized to acquire vibration data for a number of multiple components simultaneously. Such vibration monitoring may be utilized to detect mechanical faults sufficiently in advance to allow preventative maintenance to be performed. Historically, vibration data has been acquired on a per component basis using variable sampling frequencies to target specific speed components, resulting in data having to be acquired from the same sensor multiple times. The result being lengthy total acquisition times needed to monitor the full range of different rotating components. Since these data acquisitions typically require the aircraft to maintain stable flight conditions (i.e. cruise at 100 knots), the aircraft often have to do dedicated runs maintaining these flight conditions for extended periods of time just to acquire this data. The above-described embodiments allow for vibration data to be acquired at a high sample rate across all sensors only once. The above-described embodiments allow for many components to be analyzed from a single set of the acquired raw data. This reduces the time taken to acquire vibration data for each component while allowing one vibration sensor to monitor components rotating at different speeds. Further, data from all necessary components may be acquired multiple times in a single session as the time required is significantly reduced. Acquiring the information multiple times in a single session, increases the probability of detecting failures before they occur. With the above-described embodiments, dedicated flights to acquire the health data are much less likely to be required, resulting in increased aircraft availability and reduced costs.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of component monitoring for machinery having multiple rotating elements, which are rotated at different rotational speeds, and at least one vibration sensor, the method comprising:
    sampling data from the vibration sensor at a first sampling rate sufficient to monitor a fastest rotational speed of the multiple rotating elements to form a data set;
    determining an actual rotational frequency for at least one of the multiple rotating elements during the sampling of the data; and
    generating a virtual vibration waveform from the data set for at least one of the multiple rotating elements by filtering the data set to a resampling rate to monitor each of the at least one of the multiple rotating elements,
    wherein generating the virtual vibration waveform comprises determining the resampling rate based at least partially on the actual rotational frequency of the at least one of the multiple rotating elements,
    and wherein the first sampling rate is higher than the resampling rate.

2. The method of claim 1, wherein determining the actual rotational frequency for the at least one of the multiple rotating elements comprises determining the actual rotational frequency of more than one of the multiple rotating elements.

3. The method of claim 2, wherein virtual vibration waveforms are generated for all of the multiple rotating elements, and
    wherein the resampling rate is at least 2770 Hz.

4. The method of claim 1, further comprising processing the virtual waveform for each of the at least one of the multiple rotating elements to determine a health of the machinery, and
    wherein the multiple rotating elements comprise three gears.

5. The method of claim 4, wherein the processing comprises detecting, by a processor, a mechanical fault based on a determined vibration of at least one rotating component.

6. The method of claim 5, further comprising providing an alert to a user when the mechanical fault is detected, and
    wherein the resampling rate is at least 4777 Hz.

7. The method of claim 4, wherein the machinery is an aircraft, and
    wherein the resampling rate is at least 2770 Hz.

8. The method of claim 7 further comprising flying the aircraft in a fixed flight regime during the sampling,
    wherein determining the resampling rate further comprises using a decimation filter in combination with an interpolation filter.

9. The method of claim 8, further comprising repeating the flying, sampling, determining, generating, and processing after a predetermined number of flight hours.

10. The method of claim 7, further comprising communicating the generated virtual vibration waveforms from the aircraft to at least one ground system.

11. An assembly, comprising:
    rotating machinery having multiple rotating elements, which are rotated at different rotational speeds;
    a vibration sensor configured to measure vibrations of the multiple rotating elements;
    a tachometer configured to measure a rotational speed of one of the multiple rotating elements; and
    a processor operably coupled to the vibration sensor and the tachometer to receive information therefrom and configured to sample data from the vibration sensor at a first sampling rate sufficient to monitor a fastest rotational speed of the multiple rotating elements to form a data set, determine an actual rotational frequency for at least one of the multiple rotating elements during the sampling of the data and generate a virtual vibration waveform from the data set for at least one of the multiple rotating elements by filtering the data set to a resampling rate to monitor each of the at least one of the multiple rotating elements,
    wherein the resampling rate is determined based at least partially on the actual rotational frequency of the at least one of the multiple rotating elements.

12. The assembly of claim 11, further comprising a communication module for transmitting the generated waveforms.

13. The assembly of claim 11, wherein the rotating machinery is a gear box.

14. The assembly of claim 11, wherein the processor is further configured to process the virtual waveforms to determine a health of the rotating machinery.

15. The assembly of claim 11, wherein the processor comprises a filter for generating the virtual vibration waveforms.

16. A system for vibration monitoring for rotorcraft machinery, the system comprising:
   rotating machinery having multiple rotating elements, which are rotated at different rotational speeds;
   a single vibration sensor configured to measure vibrations of the multiple rotating elements;
   a tachometer configured to measure a rotational speed of one of the multiple rotating elements; and
   a processor operably coupled to the vibration sensor and the tachometer to receive information therefrom and sampling data from the vibration sensor at a first sampling rate sufficient to monitor a fastest rotational speed of the multiple rotating elements to form a data set, determine an actual rotational frequency for at least one of the multiple rotating elements during the sampling of the data and generate a virtual vibration waveform from the data set for at least one of the multiple rotating elements by filtering the data set to a resampling rate to monitor each of the at least one of the multiple rotating elements,
   wherein the resampling rate is determined based at least partially on the actual rotational frequency of the at least one of the multiple rotating elements,
   wherein the first sampling rate is higher than the resampling rate,
   wherein the multiple rotating elements comprise three or more rotating elements and
   wherein the single vibration sensor monitors vibrations of all of the multiple rotating elements simultaneously.

17. The method of claim 5, wherein detecting a mechanical fault further comprises comparison of the determined vibration to a reference value.

18. The method of claim 6, wherein detecting a mechanical fault further comprises comparison of the determined vibration to a previous determined value from a previous flight.

19. The method of claim 18, wherein determining the resampling rate further comprises using a fixed ratio filter in combination with an interpolation filter, and
   wherein the rotating machinery is installed on a rotorcraft.

* * * * *